(12) United States Patent
Germain et al.

(10) Patent No.: US 11,236,627 B2
(45) Date of Patent: Feb. 1, 2022

(54) TURBOMACHINE STATOR ELEMENT

(71) Applicant: SAFRAN AIRCRAFT ENGINES, Paris (FR)

(72) Inventors: Alexis Maxime Germain, Moissy-Cramayel (FR); Jean-Marc Claude Perrollaz, Moissy-Cramayel (FR); Pierre Grégoire Anton, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 17/055,054

(22) PCT Filed: May 13, 2019

(86) PCT No.: PCT/FR2019/051068
§ 371 (c)(1),
(2) Date: Nov. 12, 2020

(87) PCT Pub. No.: WO2019/220042
PCT Pub. Date: Nov. 21, 2019

(65) Prior Publication Data
US 2021/0215055 A1    Jul. 15, 2021

(30) Foreign Application Priority Data
May 17, 2018 (FR) .................................. 1854134

(51) Int. Cl.
*F01D 9/04* (2006.01)
*F01D 11/00* (2006.01)

(52) U.S. Cl.
CPC ............ *F01D 9/041* (2013.01); *F01D 11/005* (2013.01); *F05D 2220/30* (2013.01); *F05D 2240/12* (2013.01); *F05D 2240/55* (2013.01)

(58) Field of Classification Search
CPC ...... F01D 11/005; F01D 11/006; F01D 11/00; F01D 11/008; F01D 9/041;
(Continued)

(56) References Cited

U.S. PATENT DOCUMENTS 3,990,813 A * 11/1976 Imai .......................... F01D 5/22
416/196 R
8,105,039 B1 * 1/2012 El-Aini .................... F01D 5/225
416/195

(Continued)

FOREIGN PATENT DOCUMENTS

FR   3063118 A1 * 8/2018 ............. F01D 5/143
JP   S56162205 A   12/1981
(Continued)

OTHER PUBLICATIONS

Written Opinion of the International Searching Authority dated Aug. 13, 2019, issued in corresponding International Application No. PCT/FR2019/051068, filed May 13, 2019, 4 pages.
(Continued)

*Primary Examiner* — Woody A Lee, Jr.
*Assistant Examiner* — Brian Christopher Delrue
(74) *Attorney, Agent, or Firm* — Christensen O'Connor Johnson Kindness PLLC

(57) ABSTRACT

A turbomachine stator element extends around a longitudinal axis and includes a first stator vane and a second stator vane circumferentially adjacent to the first stator vane. Each of the first and second stator vanes include a platform and a blade extending radially from the platform. The stator element also comprising at least one inter-platform seal, arranged between the platform of the first stator vane and the platform of the second stator vane. The inter-platform seal has a flat support provided with an upper surface on which there extends a fin.

12 Claims, 6 Drawing Sheets

Fig. 6

(58) Field of Classification Search
CPC ............. F05D 2220/30; F05D 2240/12; F05D 2240/55; F05D 2240/80
See application file for complete search history.

(56) References Cited

U.S. PATENT DOCUMENTS

| | | | | |
|---|---|---|---|---|
| 8,967,973 | B2* | 3/2015 | Ingram | ................... F01D 5/143 |
| | | | | 416/191 |
| 10,519,980 | B2* | 12/2019 | Maniere | ................ F04D 29/321 |
| 2018/0163556 | A1* | 6/2018 | Dubosc | ................... F01D 5/282 |

FOREIGN PATENT DOCUMENTS

| JP | S6022002 A | 2/1985 |
|---|---|---|
| WO | 2015092306 A1 | 6/2015 |

OTHER PUBLICATIONS

International Preliminary Report on Patentability dated Nov. 17, 2020, issued in corresponding International Application No. PCT/FR2019/051068, filed May 13, 2019, 1 page.

International Search Report dated Aug. 13, 2019, issued in corresponding International Application No. PCT/FR2019/051068, filed May 13, 2019, 5 pages.

Written Opinion of the International Searching Authority dated Aug. 13, 2019, issued in corresponding International Application No. PCT/FR2019/051068, filed May 13, 2019, 5 pages.

\* cited by examiner

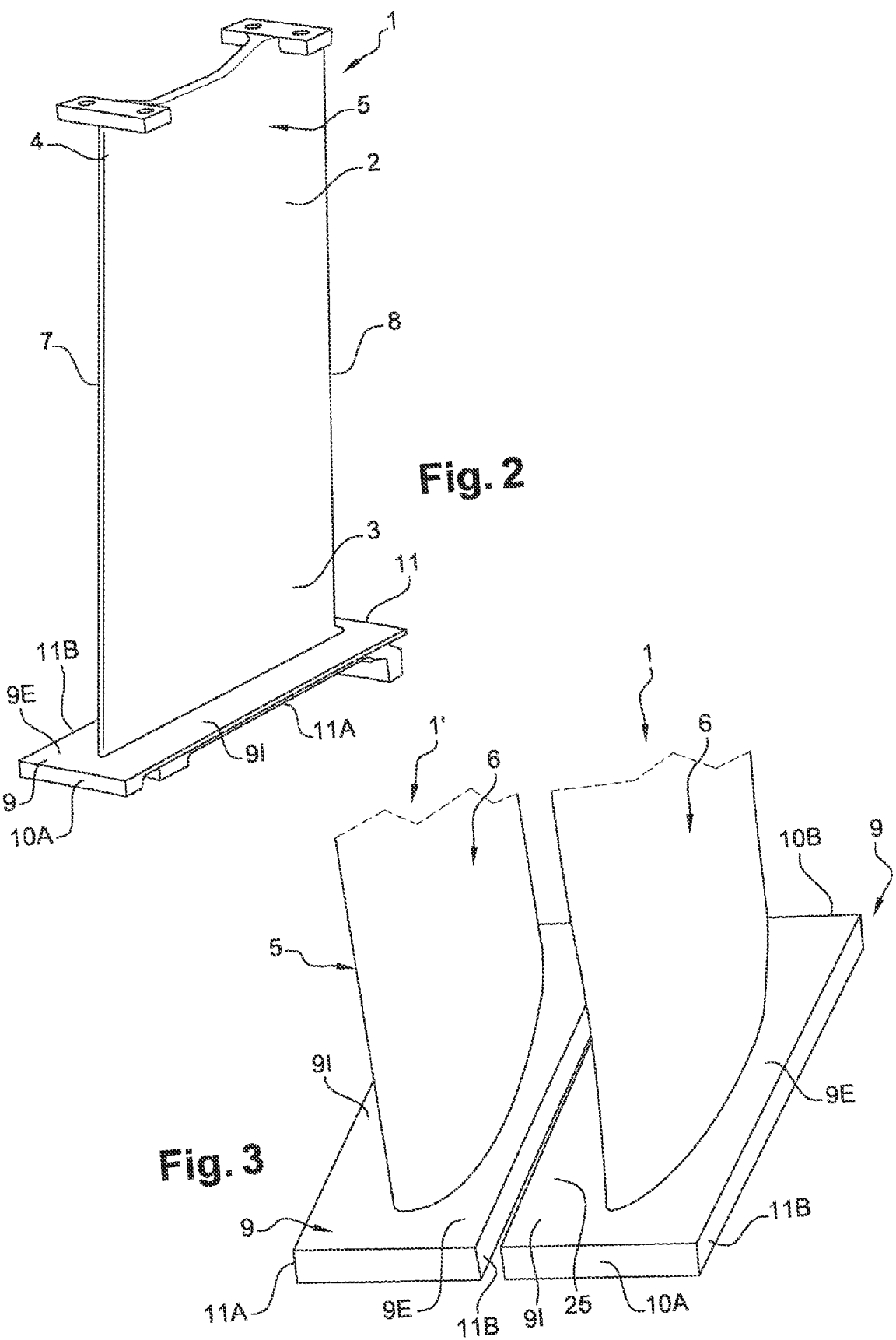

TURBOMACHINE STATOR ELEMENT

TECHNICAL FIELD

The present disclosure relates to the field of turbomachines, and in particular to dual-flow turbomachines in which air flows from upstream to downstream. It relates more precisely, but not exclusively, to a turbomachine stator element comprising stator vanes.

BACKGROUND

It is known from the double flow turbomachines comprising a mobile fan arranged upstream of a gas generator according to the flow of gases in the turbomachine. The gas generator is housed in an annular inner casing while the fan is housed in an annular outer casing. These inner and outer casings are separated by an annular inter-duct casing, so as to delimit a primary duct and a secondary duct. The fan comprises fan vanes with the free end facing the outer casing, so as to compress an incident air stream at least in the secondary duct, and preferably also in the primary duct. The turbomachine is called as a ducted fan turbomachine. The air flow circulating in the primary duct is conventionally compressed by compressor stages of the turbomachine before entering the combustion chamber. The combustion energy is recovered by turbine stages which participate in driving the compressor stages and the fan. The air flow circulating in the secondary duct contributes to the thrust of the turbomachine.

Classically, the secondary duct comprises stator vanes downstream of the fan, known as rectifiers or outlet guide vanes (OGV). These stator vanes are arranged radially from the outer surface of the inter-duct casing, downstream of the fan vanes, and help to straighten the flow generated and deflected by the fan as it rotates. Flow straightening allows the static pressure to increase by reducing the flow velocity in the fixed mark, but is accompanied by a total pressure loss. The stator vanes are designed to minimize these losses, which degrade their behaviour. However, there are also friction losses and losses caused by flow vortex. The flow vortex is generated due to the presence of a wall at the root of each vane. These flow vortices take on a roughly horseshoe shape and are distributed on the pressure side and suction side of the vanes. At its entry into a passage formed between two adjacent vanes, the flow vortex migrates from the pressure side of one vane to the suction side of the adjacent vane. When the vortex hits the suction side of the vane, it can give rise to an aerodynamic separation.

A solution to reduce the presence of this vortex between two adjacent vanes is to place several fins between the vanes. An example of fins is described in document WO 2015/092306 where they are arranged between compressor vanes. However, this is a simple modeling using aerodynamic calculations and does not integrate the constraints of manufacturing and location of the fins between the vanes.

The disclosed subject matter is intended to remedy these drawbacks, by proposing a stator element of a turbomachine in which secondary flows (corner vortex, flow vortex) are reduced, so as to guarantee the aerodynamic performance of the turbomachine.

SUMMARY

The present disclosure thus has as its subject a turbomachine stator element extending around a longitudinal axis, the element comprising at least one first stator vane and at least and one second stator vane circumferentially adjacent to the first stator vane, each first and second stator vanes comprising a platform and a blade extending radially from the platform, the stator element also comprising at least one inter-platform seal arranged between the platform of the first stator vane and the platform of the second stator vane.

In the assembly according to the disclosure, the inter-platform seal comprises a flat support provided with an upper surface on which a fin extends.

Thus, by integrating the fin into the inter-platform seal, a single part is formed, which makes it possible to overcome the problems of interface and mechanical strength between the fin and the inter-platform seal. The fin is used to guide the flows and prevent the current lines from going up on the suction side of the stator vanes.

The platform and the blade are monobloc.

The first and second stator vanes are preferably identical.

The fin is advantageously elongated in a direction roughly parallel to the longitudinal axis.

The fin can have the same curvature as the stator vane, whose suction side is located on the side of the fin.

The support of the inter-platform seal may comprise two adjacent longitudinal parts, each part conforming to the contour of one half of a platform of an adjacent vane.

The leading edge of the fin may be located longitudinally at a position between 0% and 25% of the chord connecting the leading edge of a stator vane to the trailing edge of the vane.

The length of the chord of the fin can be between 75% and 100% of the length of the chord of a stator vane.

The maximum thickness of the fin can be between 0.5 and 0.7 times the maximum thickness of a stator vane.

The distance between the fin and a vane adjacent to the fin can be between 30% and 70% of the distance between the two adjacent vanes.

The fin may comprise in cross section a top with a rounded shape.

The connecting zone between the trailing edge and/or the leading edge of the fin and the top can be of curved longitudinal section.

The connecting zone between the lower part of the fin and the upper surface of the flat support of the seal may have a curved cross section.

The radial height of the fin may be between 3% and 5% of the maximum radial height of a secondary annular duct in a turbomachine in which the stator vanes are arranged.

The stator element of the turbomachine according to the present disclosure may comprise one or more of the following characteristics, taken in isolation or in comparison with each other:

- the flat support has a length greater than that of the platform of the stator vane;
    - each longitudinal part of the support comprises a longitudinal portion and two transverse portions;
- the fin is carried by at least part of a longitudinal portion of each longitudinal part of the support;
- each longitudinal portion of the support wraps around one longitudinal edge of the platform and each transverse portion wraps around one half of a transverse edge of said platform;
- the leading edge of the fin is disposed on a first longitudinal part of the support which is arranged on the suction side of the vane, the trailing edge of the fin is disposed on a second longitudinal part of the support and remote from said first longitudinal part;
- the connecting zone between the leading edge and its top has a smaller radius of curvature than the connecting zone between the trailing edge and its top;

the inter-platform seal comprises fasteners arranged on a radial extension of the longitudinal part of the support.

The disclosure also relates to a turbomachine comprising at least one stator element.

DESCRIPTION OF THE FIGURES

The disclosed subject matter will be better understood and other details, characteristics and advantages thereof will appear when reading the following description made as a non-limitative example and with reference to the appended drawings in which:

FIG. 2 is a perspective view of an example of a stator vane to which the disclosed subject matter can be applied, FIG. 3 is a partial perspective view of a prior art stator element.

DETAILED DESCRIPTION

Figure 1:
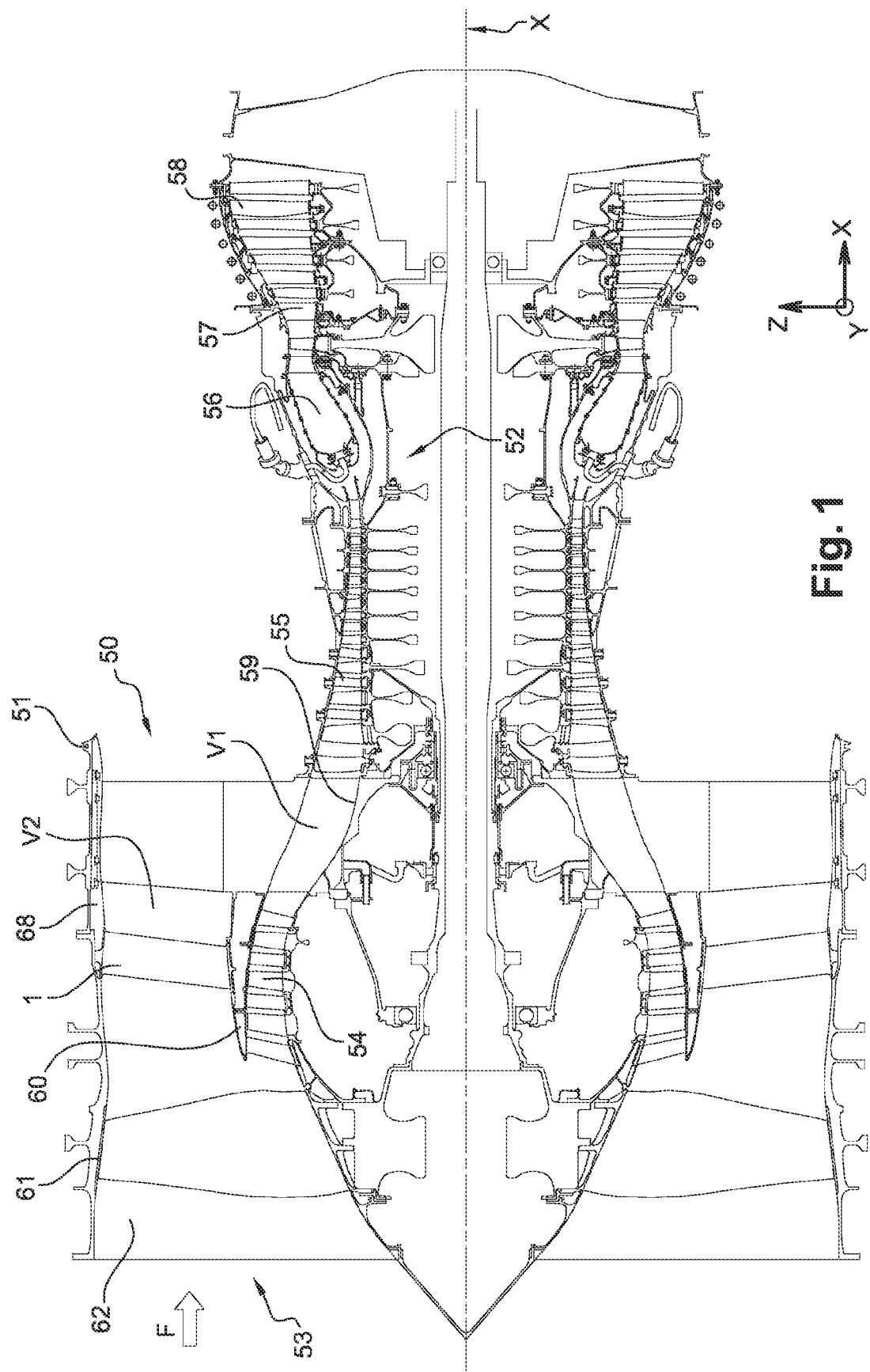
FIG. 1 schematically represents a turbomachine with a fan upstream of a gas generator.

FIG. 1 illustrates a turbomachine 50 such as an aircraft turbojet engine to which the present disclosure applies. This turbomachine 50 is here a double-flow turbomachine which extends along a longitudinal axis X. The turbomachine 50 generally comprises an external nacelle 51 surrounding a gas generator 52 upstream of which is mounted a fan 53. In the present disclosure, and in a general manner, the terms "upstream" and "downstream" are defined in relation to the flow of gases in the turbomachine. The terms "upper" and "lower" are defined with respect to a radial axis Z perpendicular to the axis X and with respect to the distance from the longitudinal axis X. A transverse axis Y is also perpendicular to the longitudinal axis X and to the radial axis Z. These axes, X, Y, Z shown in FIG. 1 form a Cartesian coordinate system.

In this example, the gas generator 52 comprises, from upstream to downstream, a low pressure compressor 54, a high pressure compressor 55, a combustion chamber 56, a high pressure turbine 57 and a low pressure turbine 58. The gas generator 52 is housed around an internal casing 59.

The fan 53 is shrouded here. It is also housed in the nacelle 51. The fan 53 compresses an air flow F entering the turbomachine 50 which is divided into a primary flow circulating in an annular primary duct V1 which passes through the gas generator 52 and a secondary flow circulating in an annular secondary duct V2 around the gas generator 52. In particular, the primary duct V1 and the secondary duct V2 are separated by an annular inter-duct casing 60 arranged between the nacelle 51 and the internal casing 59. The flow of hot air circulating in the primary duct V1 is conventionally compressed by compressor stages 54, 55 before entering the combustion chamber 56. The combustion energy is recovered by turbine stages 57, 58 which drive the compressor stages and the fan. The flow of cold air circulating in the secondary duct V2 is oriented along the longitudinal axis and contributes most of the thrust of the turbomachine.

Nacelle 51 has a generally cylindrical shape. Nacelle 51 comprises an outer fan casing 61 attached to the nacelle and surrounding a plurality of mobile fan vanes 62 that are mounted and extend radially from a fan shaft rotating along the axis X in relation to the nacelle. The free end of each vane 62 of the fan 53 faces the outer fan casing 61.

At least one radial stator vane 1 or radial stationary vane is arranged in the secondary duct V2 to straighten the cold air flow generated by the fan 53. As used herein, the term "fixed vane" or "stator vane" means a vane which is not rotated about the axis X of the turbomachine. In other words, this stator vane is distinct from and contrary to a moving or rotor vane of the turbomachine.

In this example, a plurality of stator vanes 1 of a vaned wheel is arranged transversely in the nacelle 51 substantially in a plane transverse to the longitudinal axis X. As an example, between ten and fifty stator vanes are required to straighten the cold air flow. These stator vanes 1 are arranged downstream of the fan 53. They are evenly distributed around the axis X of the turbomachine 50.

With reference to FIG. 2, each stator vane 1 comprises a blade 2 that is swept by an air flow generated by the fan. This blade 2 extends radially between a root top 3 and a head top 4. This blade 2 also comprises a pressure surface 5 and an suction surface 6 extending axially along the longitudinal axis X, between a leading edge 7 upstream and a trailing edge 8 downstream. The suction and pressure surfaces 5 and 6 are thus transversely opposite to each other. The stator vane also comprises a platform 9 from which blade 2 extends radially. The stator vanes 1 are advantageously identical and are arranged longitudinally in the same way around the entire periphery of the stator.

The platform 9 is attached to the blade 2 at its root top 3. In particular, the platform 9 and the blade 2 are monobloc. In other words, the blade 2 and the platform 9 are formed in one piece. The platform 9 extends transversely across the blade 2 to form a suction side platform portion 9E of the blade 2 and a pressure side platform portion 9I of the blade 2. The platform 9 has a substantially parallelepiped shape. Specifically, the platform 9 extends axially between a first edge 10A, upstream, and an opposite second edge 10B, downstream. The platform 9 also extends between two longitudinal edges 11A, 11B, lateral and transversely opposite. It can be of constant thickness.

FIG. 3 shows in part a set of two parts comprising two adjacent blades, here along the transverse axis, extending from a platform. In particular, a first stator vane 1 and a second stator vane 1' are adjacent. Each first and second 1' stator vane comprises one blade and an integrated platform.

Figure 4:
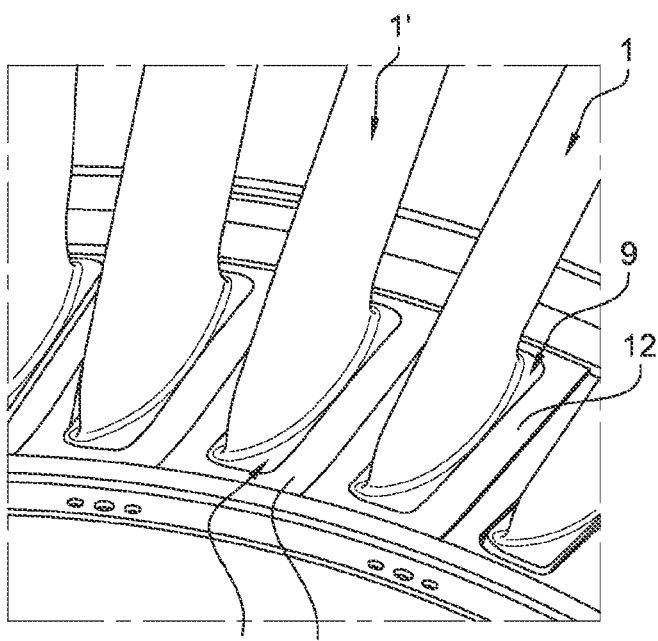
FIG. 4 is a perspective view of a prior art stator element.

As shown in FIG. 4, where the assembly 1, 1' is one of a plurality of adjacent prior art parts, each stator vane 1, 1' is surrounded at its platform 9 by an inter-platform seal 12. Thus, two adjacent stator vanes 1, 1' are in contact at their inter-platform seal 12. Each vane 1, 1' is fixed to the inter-duct casing 60 and to the nacelle 51 in such a way as to allow the resumption of forces and to ensure a structural role. The head end 4 of the stator vane is connected to a ferrule 68 of the nacelle 51 (FIG. 1). The platform 9 and seal 12 are used to create part of the inner skin of the secondary duct V2.

Each stator vane 1, 1' is made of a metallic or composite material. In an embodiment of the blade, the blade has a central recess crossing the blade on either side along the transverse axis Y. The central recess is filled with an insert. This insert can be made of composite material and can be attached to the metal blade.

Figure 5:
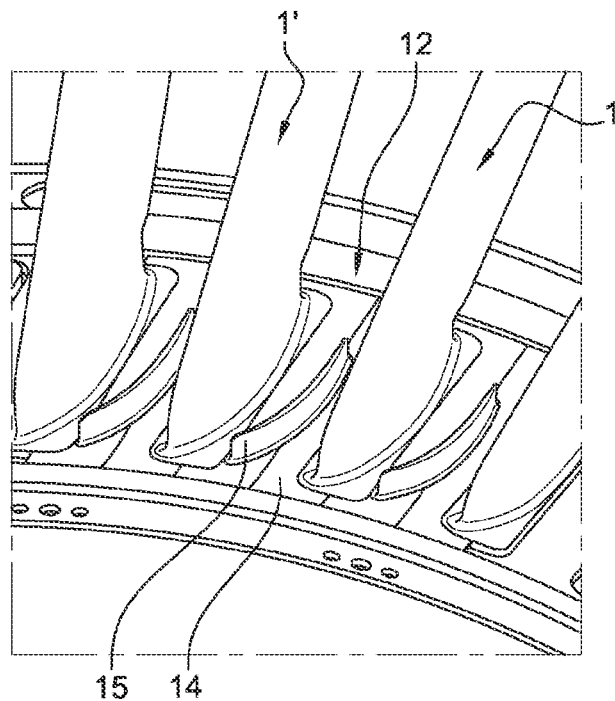
FIG. 5 is a perspective view of a stator element according to the a representative embodiment of the present disclosure.

In accordance with the invention, each inter-platform seal 12 comprises a flat support 14 with an upper surface on which a fin 15 is arranged (FIG. 5). The fin 15 is elongated in a direction substantially parallel to the longitudinal axis X. In particular, the fin 15 substantially conforms to the contour of the adjacent vanes 1. One possibility of transverse (azimuthal) distribution is that the fin 15 has the same curvature as the adjacent vane 1, whose suction side is located on the side of the fin 15. The fin 15 extends between the first 10A and second 10B borders of the suction and pressure platform parts of the vanes 1.

Figure 6:
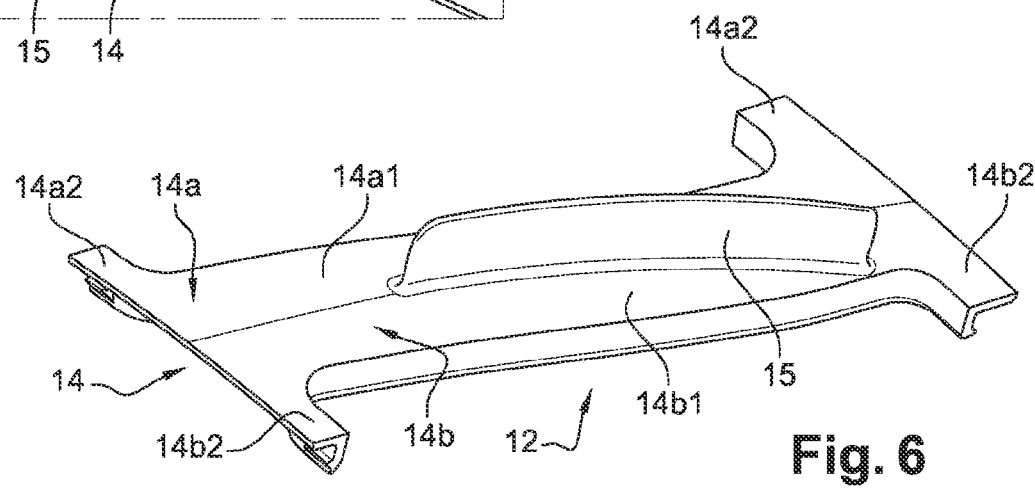
FIG. 6 is a perspective view of an inter-platform seal used in the stator element.

As shown in FIG. 6, the support 14 of the fin 15 may comprise two adjacent and symmetrical longitudinal parts 14a, 14b. Each support part 14a, 14b can be located close to the base of a vane 1 of the assembly. Thus, the part 14a is intended to be located on the suction side of the vane 1 arranged on the side of the part 14a, while the part 14b is intended to be located on the pressure side of the adjacent vane 1' arranged on the side of the part 14b. Each part 14a, 14b is thus configured to surround half of an adjacent vane 1, 1'. In particular, each part 14a, 14b follows the contour of half of a platform 9 of an adjacent vane. The part 14a thus comprises a longitudinal portion 14a1 which surrounds the longitudinal edge 11B of the platform 9 of the adjacent vane 1', and two transverse portions 14a2 which each surround a transverse edge 10A, 10B of the platform 9 of the adjacent vane 1' and which are positioned between the transverse edge 10A, 10B and an inner shroud of the inter-duct casing of the turbomachine. Similarly, the part 14b comprises a longitudinal portion 14b1 which surrounds the longitudinal edge 11A of the platform 9 of the adjacent vane 1, and two transverse portions 14b2 which each surround a transverse edge 10A, 10B of the platform 9 of the adjacent vane 1 and which are positioned between the transverse edge 10A, 10B and an inner shroud of the inter-duct casing of the turbomachine.

In general, the flat support 14 of the inter-platform seal 12 may be of a general I-shape, i.e. it comprises two end portions extending transversely to the longitudinal axis X and a central portion extending longitudinally and substantially parallel to the axis X. The end portions have substantially the same dimensions as each other. The central portion having an average width less than the width of the end portions. Each end portion of one seal support is in contact with another end portion of an adjacent support of another seal of the stator element. For example, the cross portion 14a2 of one seal support is in contact with the cross portion 14b2 of an adjacent seal support. On the other hand, each longitudinal part 14a, 14b of the support may have a general L-shape with an axial part that is formed in particular by longitudinal parts 14a1, 14b1 and transverse portions 14a2, 14ba, and a radial part 14c extending inwardly from the support. This radial part 14c of the support is in contact with the platform 9. The radial part 14c may comprise a first radial part 14c1 which extends radially and inward from the longitudinal portion 14a1, 14b1. Similarly, the part 14c may comprise a second radial part 14c2 which extends radially and inwardly from the transverse portion(s) 14a2, 14b2. This particular configuration of the flat support 14 of the seal 12 allows the sealing of the junction zones between the platforms of adjacent vanes, while ensuring an optimal and substantially uniform surface around the adjacent vanes for aerodynamic flow of the secondary flows. In addition, it is also possible to easily assemble this seal 12 above and between two platforms 9 of two adjacent vanes 1, 1', without compromising the sealing of the stator element. This central portion therefore comprises the longitudinal portions 14a1 and 14b1 and the terminal portions comprise the transverse portions, 14a2, 14b2. A fin 15 may be worn at least partially on upper surfaces of these longitudinal portions.

The fin 15 may comprise a leading edge BA located on one support part 14a, e.g. support part 14a located on the side of the adjacent vane 1 with its suction side located on the side of the fin 15, and a trailing edge BF located on the other support part 14b. This particular geometry of the fins, substantially similar to the shape of the vane and positioned between adjacent vanes, guides the flow of the secondary flow and acts as a barrier to the current line rising on the suction side of the vanes. In addition, this particular fin geometry can also limit the static pressure distortion effects that can be generated within the secondary flow in the vicinity of the vanes.

Figure 7:
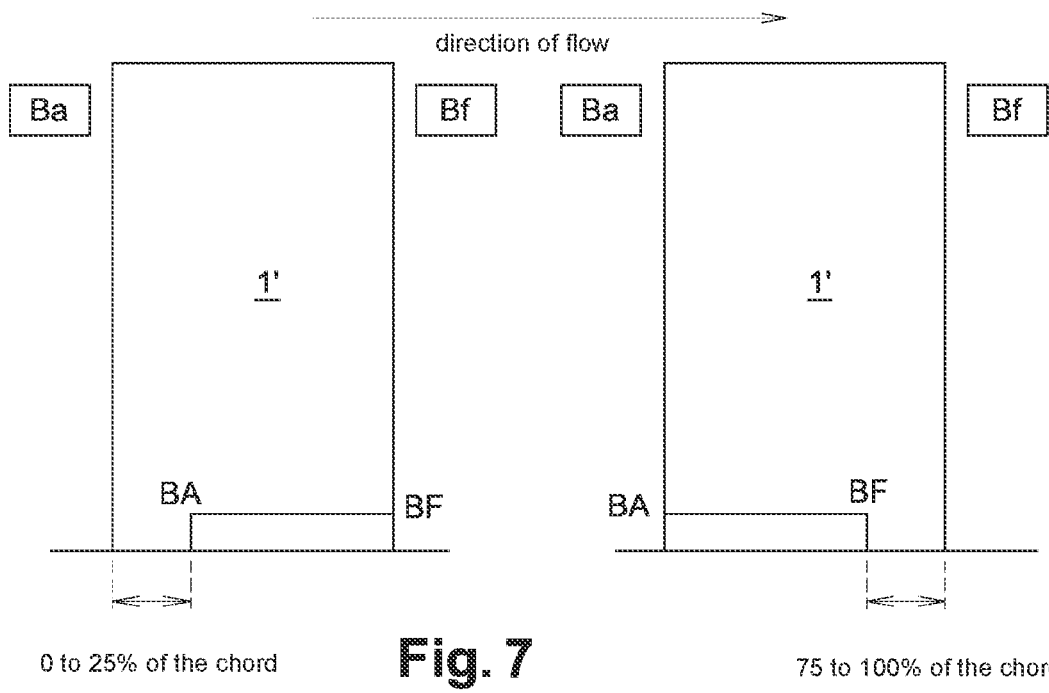
FIG. 7 is a diagram illustrating schematically two configurations of the inter-platform seal in the stator element.
Figure 8:
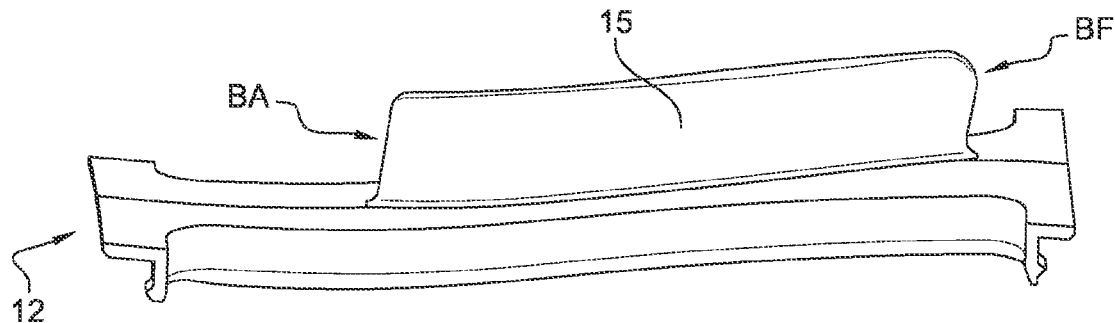
FIGS. 8 and 9 are perspective views of the two inter-platform seal configurations.
Figure 9:
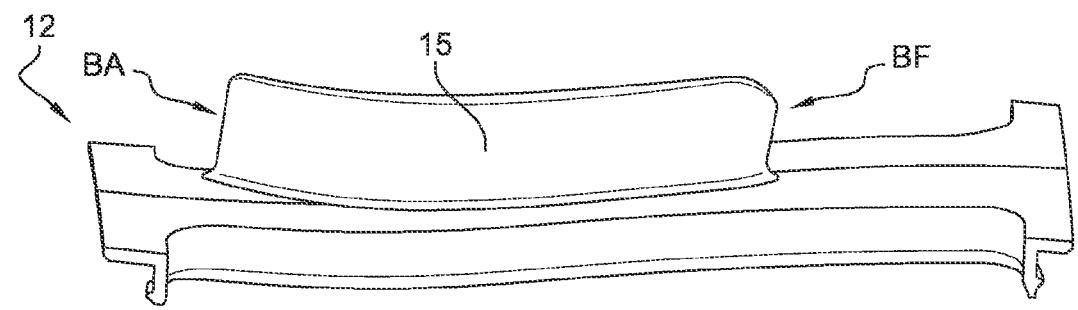

As illustrated in FIGS. 7 to 9, the leading edge BA of the fin 15 can be located longitudinally at a position between 0% and 25% of the chord (or chord line) connecting the leading edge Ba of an adjacent vane to the trailing edge Bf of the vane.

Thus, the leading edge BA of the fin 15 can be located between two extreme positions. In a first extreme position (left diagram of FIG. 7 and FIG. 8), the leading edge BA of the fin 15 is located at a position equal to 25% of the chord of the vane, i.e. there is between the leading edge Ba of the vane and the leading edge BA of the fin a spacing equal to 25% of the length of the chord, the trailing edge BF of the fin 15 coinciding longitudinally with the trailing edge Bf of the vane. In this first end position, the fin 15 is not subject to the potential problems of over-incidence of the upstream flow because its leading edge BA is set back from the leading edge Ba of the vane. This arrangement makes it possible to rehomogenize the exit angle of the vane in a very effective way. The flow at the outlet of the vane is rectified, thus improving the performance of the secondary channel by minimizing pressure drops.

In a second end position (right diagram of FIG. 7 and FIG. 9), the leading edge BA of the fin 15 is located at a position equal to 0% of the chord of the vane, i.e. the leading edge Ba of the vane and the leading edge BA of the fin coinciding longitudinally, and there is between the trailing edge BF of the fin and the trailing edge Bf of the vane a spacing equal to 25% of the length of the chord. This second end position makes it possible to limit the development of the vortex at an earlier stage in the passage of the hub.

As shown in FIG. 7, the length of the chord of the fin 15 is equal to 75% of the length of the chord of the vane. The chord of the fin 15 is the straight line connecting the leading edge BA of the fin 15 to the trailing edge BF of the fin 15. It is also possible to consider that the length of the chord of the fin is between 75% and 100% of the length of the chord of the vane. The height of the fin 15 may be less than 10% of the radial extent of the secondary duct. More specifically, the height of the fin 15 may be between 3% and 5% of the height of the secondary duct. The maximum thickness of the fin 15 is advantageously between 0.5 and 0.7 times the maximum thickness of the vane, in order to ensure sufficient mechanical strength without excessively obstructing the channel. Concerning the lateral (azimuthal) positioning of the fin 15, the distance between the fin 15 and a vane adjacent to the fin 15 can be between 30% and 70% of the inter-vane pitch (i.e. the distance between two adjacent vanes), the position of the fin 15 for a distance equal to 50% of the pitch being the mid-channel position.

Figure 10:
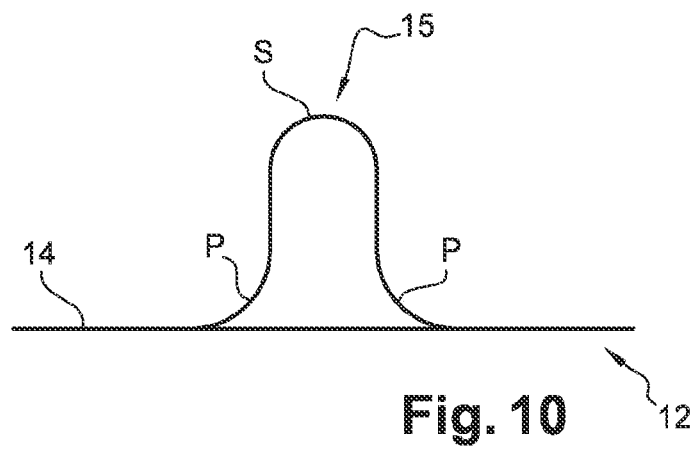
FIGS. 10 and 11 are schematic partial views of the inter-platform seal.

As shown in cross section in FIG. 10, the fin 15 may have a top S in rounded shape, called wing tip. By removing the sharp edges of the top S of the fin 15, the clearance vortex and the wake of the fin 15 is attenuated. In the same way, the roots P of the fin 15 can be of curved section. The roots P of the fin 15 being over-thickened with respect to the top S of the fin 15.

Figure 11:
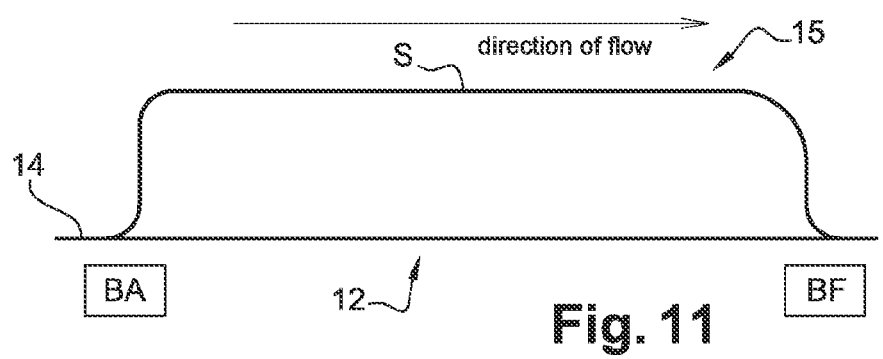

As shown in longitudinal section in FIG. 11, the connecting zone between the BA leading edge of the fin 15 and the wing tip S is curved. The radius of curvature is advantageously of the order of 2 mm. In the same way, the connecting zone between the wing tip and the trailing edge BF of the fin 15 and the wing tip S is curved, and its radius of curvature is advantageously of the order of 4 mm. This rounded configuration also allows to attenuate the clearance vortex and the wake of the fin 15.

The geometrical laws of the stator vanes 1 are advantageously used for the geometrical construction of the fins 15. Thus, the skeleton angles of the fin can be identical to the skeleton angles of the stator vanes. The skeleton angle is the angle between the tangent at each point of the vane skeleton and the motor axis.

A turbomachine vane comprising a plurality of vane sections stacked along a radial axis, each vane section extending along a longitudinal axis between a leading edge and a trailing edge, and along a tangential axis between a pressure face and a suction face, the vane sections are distributed according to longitudinal Xg and tangential Yg distribution laws defining the positioning of their respective center of gravity with respect to the said longitudinal and tangential axes according to the height of the vane extending from the root of the vane to its head. The longitudinal Xg and tangential Yg distribution laws of the fin 15 are advantageously identical to the longitudinal Xg and tangential Yg distribution laws of the stator vanes. Likewise, the thickness/chord law of the fin is advantageously identical to the thickness/chord law of the stator vanes.

Figure 12:
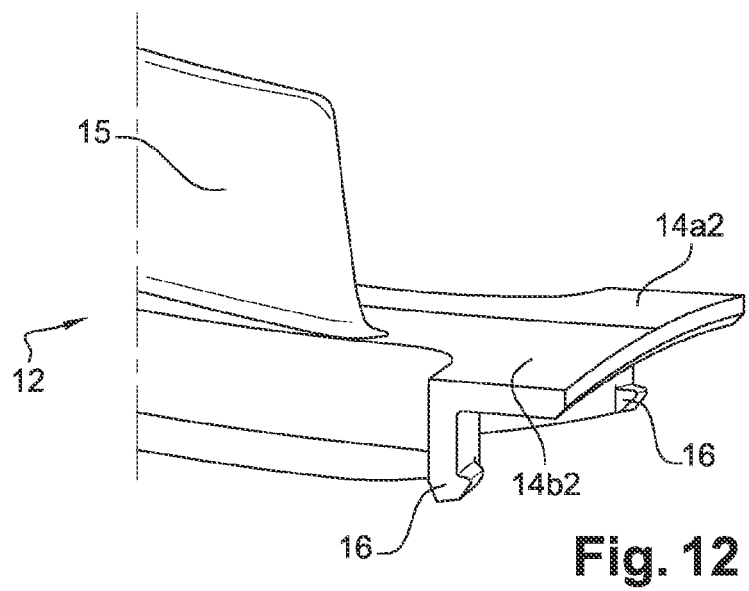
FIGS. 12 to 14 are perspective views of the inter-platform seal, in accordance with an embodiment of an attachment of the seal.
Figure 13:
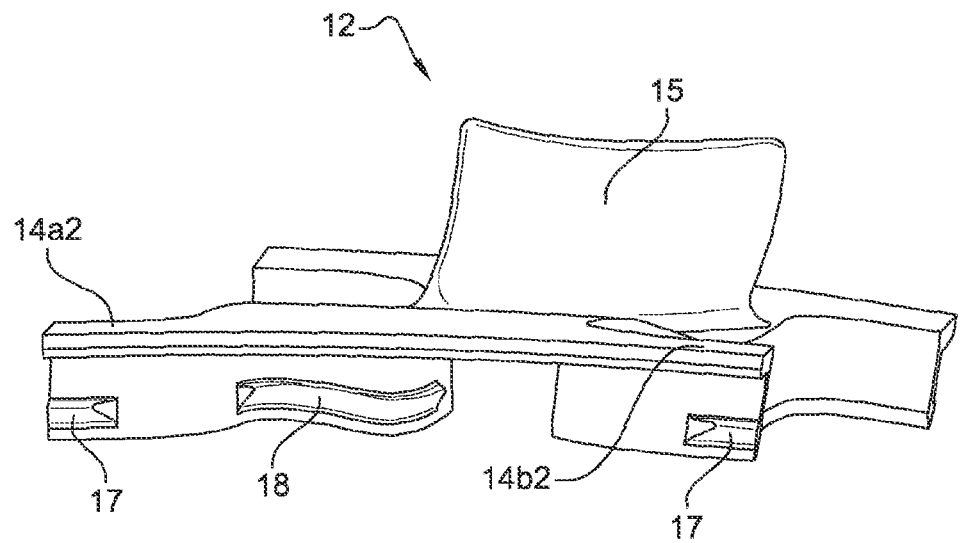
Figure 14:
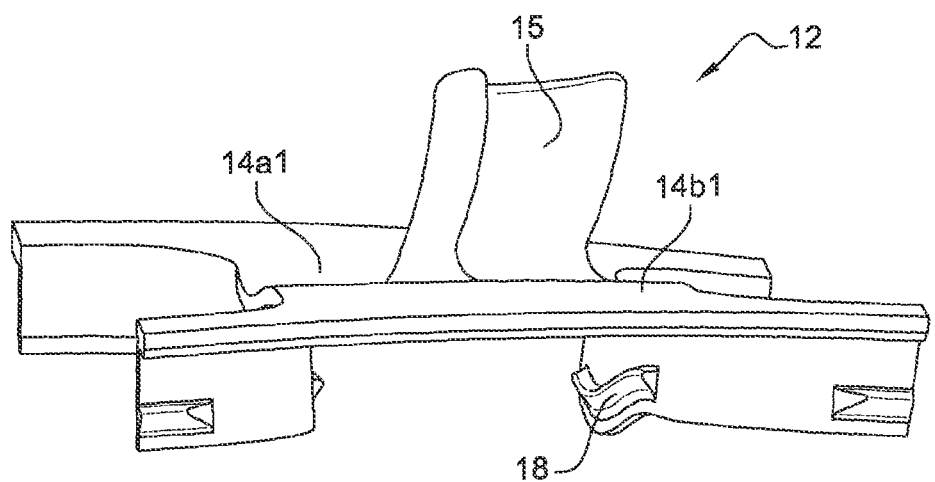

The inter-platform seal may comprise means for hooking onto corresponding protruding portions of casing shells. As shown in FIG. 12, clips 16 can be positioned downstream, under the support 14 of the inter-platform seal 12, at the downstream cross portions 14a2, 14b2 of the seal 12. Similarly, clips 17 can be positioned upstream, under the support 14 of inter-platform seal 12, at the upstream cross portions 14a2, 14b2 of the seal 12 (FIG. 13). In particular, the clips 16, 17 are arranged on the second radial part 14c2 of the support. In addition, lateral clips 18 can be positioned laterally, on the inner sides of the support 14 of the inter-platform seal 12, at the longitudinal portions 14a1, 14b1 of the seal 12 (FIGS. 13 and 14). In particular, the clips 18 are arranged on the first radial part 14c1 of the support.

The invention claimed is:

1. A stator element of a turbomachine, extending around a longitudinal axis, the element comprising at least one first stator vane and at least one second stator vane, circumferentially adjacent to the first stator vane, each first and second stator vanes comprising a platform and a blade extending radially from the platform, the stator element also comprising at least one inter-platform seal, arranged between the platform of the first stator vane and the platform of the second stator vane (1'), wherein the inter-platform seal comprises a flat support provided with an upper surface on which a fin extends, the support of the at least one inter-platform seal comprising two adjacent longitudinal parts, each part conforming to the contour of one half of a platform of an adjacent vane.

2. The stator element according to claim 1, wherein the fin is elongated in a direction parallel to the longitudinal axis.

3. The stator element according to claim 1, wherein the fin has the same curvature as the stator vane, the suction side of which is located on a side of the fin.

4. The stator element according to claim 1, wherein a leading edge of the fin is located longitudinally at a position between 0% and 25% of a chord connecting the leading edge of one of the first and second stator vanes to a trailing edge of the one of the first and second stator vanes.

5. The stator element according to claim 1, wherein a length of a chord of the fin is between 75% and 100% of a length of a chord of a stator vane.

6. The stator element according to claim 1, wherein a maximum thickness of the fin is between 0.5 and 0.7 times a maximum thickness of a stator vane.

7. The stator element according to claim 1, wherein a distance between the fin and one of the first and second vanes adjacent to the fin is between 30% and 70% of a distance between the first and second vanes.

8. The stator element according to claim 1, wherein the fin comprises in cross section a top with a rounded shape.

9. The stator element according to claim 8, wherein a connecting zone between the top and at least one of a trailing edge and a leading edge of the fin has a curved longitudinal section.

10. The stator element according claim 1, wherein a connecting zone between a lower part of the fin and the upper surface of the flat support of the seal has a curved cross-section.

11. The stator element according to claim 1, wherein ae radial height of the fin is between 3% and 5% of a maximum radial height of a secondary annular duct of a turbomachine in which the first and second stator vanes are arranged.

12. A turbomachine, comprising at least one stator element according to claim 1.

* * * * *

UNITED STATES PATENT AND TRADEMARK OFFICE
CERTIFICATE OF CORRECTION

PATENT NO. : 11,236,627 B2
APPLICATION NO. : 17/055054
DATED : February 1, 2022
INVENTOR(S) : A. Germain et al.

It is certified that error appears in the above-identified patent and that said Letters Patent is hereby corrected as shown below:

In the Claims

| Column | Line | |
|---|---|---|
| 8 | 10 | Claim 1, change "vane (1')" to -- vane -- |
| 8 | 43 | Claim 10, change "according claim" to -- according to claim -- |
| 8 | 46 | Claim 10, change "cross-section" to -- cross section -- |
| 8 | 47 | Claim 11, change "wherein ae" to -- wherein a -- |

Signed and Sealed this
Eighteenth Day of April, 2023

Katherine Kelly Vidal
*Director of the United States Patent and Trademark Office*